United States Patent [19]

Okamoto et al.

[11] 3,966,922

[45] June 29, 1976

[54] COMPOSITION FOR POULTRY AND LIVESTOCK

[75] Inventors: Taneji Okamoto, Toyonaka; Kuniyoshi Fujie, Takatsuki; Sadao Kondo, Kawani, all of Japan

[73] Assignee: Takeda Chemical Industries, Ltd., Japan

[22] Filed: July 23, 1971

[21] Appl. No.: 165,695

[52] U.S. Cl. ............................ 424/227; 424/252; 424/317; 424/333; 424/340; 424/346
[51] Int. Cl.² ................................ A61K 31/65
[58] Field of Search ................. 424/227, 252, 346

[56] References Cited
UNITED STATES PATENTS

| | | | |
|---|---|---|---|
| 2,807,568 | 9/1957 | Joyner et al. | 424/227 |
| 2,918,410 | 12/1959 | Popino et al. | 99/2 X |
| 2,990,331 | 6/1961 | Bingen et al. | 424/227 |
| 3,427,166 | 2/1969 | Abbey et al. | 424/227 |

OTHER PUBLICATIONS

*Chemical Abstracts,* vol. 56, (1962), 5220, 8853; vol. 61, (1964), 6353; vol. 63, 986 (1965); vol. 65, (1965), 13459–13460.

*Primary Examiner*—Frederick E. Waddell
*Attorney, Agent, or Firm*—Wenderoth, Lind & Ponack

[57] ABSTRACT

Stable compositions for poultry and livestock comprising a tetracycline compound, a vitamin $B_2$ compound and a phenol are disclosed.

6 Claims, No Drawings

COMPOSITION FOR POULTRY AND LIVESTOCK

This invention relates to a composition for poultry and livestock, the composition being stable even in the state of its aqueous solution. The composition comprises at least one of tetracyclines, one of vitamin $B_2$ compounds and a phenol compound represented by the general formula:

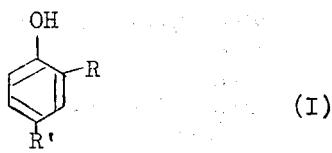

wherein R means hydrogen atom, methoxy or carboxy radical; R' means hydrogen atom, hydroxy, formyl or carboxy radical.

In recent years, the animal drugs containing vitamins or antibiotics, etc., have been developed for the purpose of growth promotion, heightening of egg production rate and hatching rate or the prophylaxis and cure of diseases in poultry and livestock. In view of a large-scale production in animal husbandry, these drugs have been advantageously employed in the form of an aqueous solution which is fed as drinking water, etc.

However, it was revealed that, in an aqueous solution containing tetracyclines and vitamin $B_2$ compounds, the former is liable to be decomposed when the aqueous solution is exposed to light, e.g. sun-light. That is to say, the tetracyclines are remarkably decomposed when the solution is allowed to stand for a day in the shade at the open air, in the consistence with the vitamin $B_2$ compounds in the solution, while the content of the tetracyclines is practically same as the initial, when the solution containing tetracyclines alone is exposed even to sun-light at the open air for a day. For example, when the solution containing 80 $\mu$g of tetracycline and 4 $\mu$g. of vitamin $B_2$ is allowed to stand for three hours in the shade at the open air, more than 80% of the tetracycline is decomposed.

The present inventors conducted an extensive research in order to circumvent the foregoing disadvantage and has ultimately discovered that the tetracyclines co-existing with vitamin $B_2$ compounds in an aqueous solution are stabilized against the light by adding a phenol compound of the formula (I). The present invention is based on this finding.

The principal object of the present invention is to provide a composition for poultry and livestock, being stable even in the state of its aqueous solution, which comprises at least one of tetracyclines, one of vitamin $B_2$ compounds and a phenol compound (I).

Another object is to provide a method for stabilizing water-soluble composition for the poultry and livestock containing at least one of tetracyclines and one of vitamin $B_2$ compounds by adding a phenol compound (I) to the composition.

Other objects will become apparent from the detailed description hereinafter provided.

The tetracyclines mentioned above are represented by the general formula:

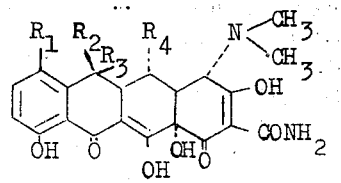

wherein $R_1$ means hydrogen, chlorine or dimethylamino group, $R_2$ and $R_4$ hydrogen or hydroxyl group, and $R_3$ hydrogen or methyl group. These are exemplified by tetracycline, chlortetracycline, demethylchlortetracycline, oxytetracycline, demethyltetracycline, methacycline, doxycycline and minocycline, etc. or an inorganic acid salt thereof (e.g. salt with metaphosphoric acid, phosphoric acid, hydrochloric acid, and sulfuric acid, etc.) or sodium.

The vitamin $B_2$ compounds mean vitamin $B_2$ and its derivatives, e.g. flavin mono-nucleotide and flavin adenine dinucleotide, etc.

As the phenol compound (I), there may be employed, for example, salicylic acid, 2,5-dihydroxybenzoic acid, catechol, protocatechuic acid, vanillin or a salt, thereof with e.g. sodium, potassium, etc.

The phenol compound (I) is mixed with vitamin $B_2$ compounds and tetracyclines, and the mixture may further be prepared into such a form as tablet, granule or the like. If desired, these preparations may further contain suitable non-toxic and water soluble solid carrier (e.g. glucose, fructose, cane sugar and lactose, etc.) or a suitable non-toxic liquid and water-miscible carrier (e.g. water, and ethanol, etc.). Though the suitable proportion of phenol compound (I) to be added generally falls within the range from about 0.5 to about 20 parts by weight, more preferably, from about 2 to about 10 parts by weight relative to one part by weight of vitamin $B_2$ compound. The above range may somewhat vary with the kind of vitamin $B_2$ compounds and phenol compounds (I) or the manner of practical administration. The tetracyclines are, generally, used from about 1 to about 200 parts by weight, more preferably, from about 5 to 100 part by weight, relative to one part by weight of vitamin $B_2$ compounds, but those amounts have substantially nothing to do with the amount of the phenol compound (I) to be added. Thus prepared water soluble composition is usually, dissolved in water and the aqueous solution may be administered to poultry or livestock as a drinking water. Alternatively, the water soluble composition or its aqueous solution may be added to a feed of poultry or livestock. Suitable concentration of tetracycline is about 0.00005 to about 0.05% when the composition is administered as a drinking water. When the composition is admixed with feeds, the tetracycline concentration is preferably in the range of 0.0001 to 0.1%.

The present water-soluble composition may further contain such compounds as do not decrease the stability of the present composition, for example active vitamin $B_1$ derivatives such as thiamine propyldisulfide, thiamine tetrahydrofurfuryl disulfide, thiamino-8-(methyl-6-acetyldihydrothioctate)disulfide, benzoylthiamine monophosphate, benzoylthiamine disulfide, o-butyrylthiamine disulfide, nicotinic acid amide, calcium pantothenate and dioxycarbonylthiamine, vitamin $B_6$ compounds such as pyridoxine, vitamin C, vitamin $K_4$, vitamin A, vitamin $D_3$, vitamin E, folic acid, $\alpha$-amino acids such as methionine and lysine, etc. sulfa drugs such as sulfadimethoxine, sulfamethazine, sulfisozole, sulfapyridazine, sulfathiazole, sulfisomezole, sulfadiazine, sulfamonomethocine, sulfamerazine and sulfisoxazol, edible pigments such as Brilliant Blue FCF, Fast Green FCF, Acid Violet 6B, Tartrazine, Sunset yellow FCF, Erythrosine and Ponceau SX.

For the purpose of giving those skilled in the art a better understanding of the invention, the following illustrative Tests and Examples are given. In the formulations of the following Tests "part(s) by weight" bears the same relation to part(s) by volume as does gram(s) to milliliter(s) and percent (%) is shown on weight basis.

TEST 1

1. Test composition: a mixture of 4.0 parts by weight of chlortetracycline hydrochloride, 0.2 part by weight of vitamin $B_2$, 1.0 part by weight of variable phenol compound (I) and 94.8 parts by weight of glucose.
2. Control composition: a mixture of 4.0 parts by weight of chlortetracycline, hydrochloride, 0.2 part by weight of vitamin $B_2$ and 95.8 parts by weight of glucose.
3. Procedure:

Various phenol compounds (I) are tested on their stabilizing effect by the following procedure. Each composition is dissolved in water so as to make its concentration of 0.2%. 100 Parts by volume of each solution is allowed to stand for three hours in the shade at the open air. The residual percent of tetracyclines in respective tests hereinafter are calculated on the basis of the results of bioassay employing Sarcina lutea (ATCC 9341) in terms of free tetracyclines.

4. Results:

Table I

| Phenol compound (I) | Residual % of chlortetracycline after 3 hours. |
|---|---|
| —(control) | 18 |
| 2.5-dioxybenzoic acid | 88 |
| salicylic acid | 86 |
| vanillin | 80 |
| protocatechuic acid | 78 |
| p-oxybenzoic acid | 75 |
| catechol | 76 |

TEST 2

1. Test composition: a mixture of 2.0 parts by weight of oxytetracycline hydrochloride, 0.2 part by weight of vitamin $B_2$, 1.0 part by weight of variable phenol compound (I) and 96.8 parts by weight of lactose.
2. Control composition: a mixture of 2.0 parts by weight of oxytetracycline hydrochloride, 0.2 part by weight of vitamin $B_2$ and 97.8 parts by weight of lactose.
3. Procedure:

Various phenol compounds (I) are tested in the same manner as Test 1.

4. Results:

Table II

| Phenol compound (I) | Residual % of oxytetracycline after 3 hours |
|---|---|
| —(control) | 20 |
| 2,5-dioxybenzoic acid | 81 |
| salicylic acid | 77 |
| vanillin | 79 |
| p-oxybenzoic acid | 70 |

TEST 3

1. Test composition: a mixture of 4.0 parts by weight of tetracycline hydrochloride, 0.2 part by weight of vitamin $B_2$, 3.0 parts by weight of variable phenol compound (I) and 92.8 part by weight of lactose.
2. Control composition: a mixture of 4.0 parts by weight of tetracycline hydrochloride, 0.2 part by weight of vitamin $B_2$ and 95.8 part by weight of lactose.
3. Procedure:

Various phenol compounds (I) are tested in the same manner as Test 1.

4. Result:

Table III

| Phenol compound (I) | Residual % of tetracycline after 3 hours |
|---|---|
| —(control) | 19 |
| 2,5-dioxybenzoic acid | 73 |
| salicylic acid | 68 |
| vanillin | 69 |
| catechol | 65 |

TEST 4

1. Test composition: a mixture of 4.0 parts by weight of chlortetracycline hydrochloride, 0.3 part by weight of flavin mononucleotide, 1.0 part by weight of variable phenol compound (I) and 94.7 part by weight of lactose.
2. Control composition: a mixture of 4.0 parts by weight of chlortetracycline hydrochloride, 0.3 part by weight of flavin mononucleotide and 95.7 part by weight of lactose.
3. Procedure:

Various phenol compounds (I) are tested in the same manner as Test 1.

4. Results:

Table IV

| Phenol compound (I) | Residual % of chlortetracycline after 3 hours. |
|---|---|
| (control) | 24 |
| 2,5-dioxybenzoic acid | 92 |
| salicylic acid | 89 |
| vanillin | 89 |

TEST 5

1. Test composition: a mixture of 4.0 parts by weight of chlortetracycline hydrochloride, 0.4 part by weight of flavin adenine dinucleotide, 1.5 parts by weight of variable phenol compound (I) and 94.1 parts by weight of glucose.
2. Control composition: a mixture of 4.0 parts by weight of chlortetracycline hydrochloride, 0.4 part by weight of flavin adenine dinucleotide and 95.6 part by weight of glucose.
3. Procedure:

Various phenol compounds (I) are tested in the same manner as Test 1.

4. Results:

Table V

| Phenol compound (1) | Residual % of chlortetracycline after 3 hours |
| --- | --- |
| —(control) | 28 |
| 2,5-dioxybenzoic acid | 95 |
| salicylic acid | 93 |
| vanilline | 94 |

EXAMPLE 1

Powder
(in 1000 g.)

| | |
| --- | --- |
| Chlorotetracycline hydrochloride | 55 g. |
| Vitamin A | 2500000 IU |
| Vitamin D$_3$ | 500000 IU |
| Vitamin B$_1$ hydrochloride | 2 g. |
| Vitamin B$_2$ | 5 g. |
| Vitamin B$_6$ | 2 g. |
| Vitamin B$_{12}$ | 5 g. |
| Vitamin E | 1 g. |
| Vitamin K$_4$ | 1 g. |
| Nicotinic acid amide | 10 g. |
| Calcium pantothenate | 5 g. |
| folic acid | 0.2 g. |
| 2,5-dioxybenzoic acid | 20 g. |
| lactose | added to make 1000 g. |

The above formulation is dissolved in water to make the concentration of tetracycline hydrochloride of 0.005 percent. The solution is given to poultry or livestock as drinking water.

EXAMPLE 2

Powder
(in 1000 g.)

| | |
| --- | --- |
| Chlorotetracycline hydrochloride | 50 g. |
| Sulfisozole | 150 g. |
| Vitamin A | 3000000 IU |
| Vitamin D$_3$ | 600000 IU |
| Vitamin E | 1.2 g. |
| Vitamin B$_1$ | 1 g. |
| Vitamin B$_2$ | 5 g. |
| Vitamin B$_6$ | 2 g. |
| Vitamin B$_{12}$ | 0.005 g. |
| Vitamin K$_3$ | 2 g. |
| Nicotinic acid amide | 10 g. |
| Calcium pantothenate | 5 g. |
| Folic acid | 0.2 g. |
| Tartrazine | 2.5 g. |
| 2,5-dioxybenzoic acid | 25 g. |
| lactose | 200 g. |
| Glucose | added to make 1000 g. |

The above formulation is dissolved in water to make the concentration of tetracycline hydrochloride of 0.01 percent. The solution is given to poultry or livestock as drinking water.

What is claimed is:

1. A composition for poultry and livestock, which is stable in aqueous solution, which comprises from 1 to 200 parts by weight of a tetracycline compound selected from the group consisting of tetracycline, oxytetracycline, demethyltetracycline, doxycycline, chlortetracycline, demethylchlortetracycline, minocycline, methacycline and salts thereof with meta-phosphoric acid, phosphoric acid, sodium, hydrochloric acid and sulphuric acid, 1 part by weight of one of vitamin B$_2$ compounds selected from the group consisting of vitamin B$_2$, flavin mono-nucleotide and flavin adenine dinucleotide and from 0.5 to 20 parts by weight of vanillin.

2. The composition of claim 1, wherein the composition contains from 5 to 100 parts by weight of the tetracycline antibiotic and from 2 to 10 parts by weight of vanillin relative to one part by weight of the vitamin B$_2$ compound.

3. The composition of claim 1, wherein chlortetracycline is employed as the tetracycline compound.

4. The composition of claim 1, wherein oxytetracycline is employed as the tetracycline compound.

5. The composition of claim 1, wherein tetracycline is employed as the tetracycline compound.

6. A composition according to claim 3 wherein the vitamin B$_2$ compound is vitamin B$_2$.

* * * * *